US012603693B2

(12) United States Patent
Sohrabi et al.

(10) Patent No.: US 12,603,693 B2
(45) Date of Patent: Apr. 14, 2026

(54) MIXED DIGITAL AND SUBARRAY-BASED BEAMFORMER

(71) Applicant: Nokia Solutions and Networks Oy, Espoo (FI)

(72) Inventors: Foad Sohrabi, Murray Hill, NJ (US); Pavan Koteshwar Srinath, Massy (FR); Jinfeng Du, Murray Hill, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/261,157

(22) Filed: Jul. 7, 2025

(65) Prior Publication Data

US 2026/0025191 A1 Jan. 22, 2026

(30) Foreign Application Priority Data

Jul. 18, 2024 (FI) ...................................... 20245905

(51) Int. Cl.
*H04B 7/08* (2006.01)
(52) U.S. Cl.
CPC ..................................... *H04B 7/086* (2013.01)
(58) Field of Classification Search
CPC ... H04B 7/02; H04B 7/04; H04B 7/08; H04B 7/0837; H04B 7/0842; H04B 7/086; H04B 7/0862; H04B 7/0865; H04B 7/0868; H04B 7/0871; H04B 7/0874; H04B 7/088; H04B 7/0882; H04B 7/0885
See application file for complete search history.

(56) References Cited

U.S. PATENT DOCUMENTS

| | | | |
|---|---|---|---|
| 10,211,906 B1* | 2/2019 | Nam | H04B 7/0452 |
| 10,224,991 B2* | 3/2019 | Nair | H04B 7/0696 |
| 10,998,945 B1* | 5/2021 | Baligh | B25J 9/0093 |
| 11,095,350 B1* | 8/2021 | Montalvo | H04B 7/0617 |
| 11,570,711 B2* | 1/2023 | Pezeshki | H04W 72/53 |

(Continued)

OTHER PUBLICATIONS

Song et al., "Fully-/ Partially-Connected Hybrid Beamforming Architectures for mmWave MU-MIMO", IEEE Transactions on Wireless Communications, vol. 19, No. 03, Mar. 2020, pp. 1754-1769.

(Continued)

*Primary Examiner* — James M Perez
(74) *Attorney, Agent, or Firm* — Nokia Technologies Oy

(57) ABSTRACT

According to an aspect, an apparatus may receive at least one uplink pilot associated with a receiver comprising at least one digital beamforming, DBF, -panel and at least one subarray-based beamforming, SABBF, -panel, the at least one DBF-panel having an associated DBF-channel and the at least one SABBF-panel having an associated SABBF-channel. Furthermore, based on channel distributions of the DBF-channel and the SABFF-channel and further based on the at least one uplink pilot, the apparatus may determine at least one estimated strongest direction of a common covariance matrix associated with the at least one DBF-panel and the at least one SABBF-panel. Finally, the apparatus may determine a beamforming vector for at least one transmission phase or at least one reception phase based on the at least one estimated strongest direction of the common covariance matrix.

15 Claims, 5 Drawing Sheets

(56) References Cited

U.S. PATENT DOCUMENTS

| | | | | |
|---|---|---|---|---|
| 11,677,476 | B2 * | 6/2023 | Du | H04B 10/58 |
| | | | | 398/115 |
| 11,894,899 | B1 * | 2/2024 | Wang | H04B 7/0617 |
| 11,962,097 | B2 * | 4/2024 | Du | H04B 7/0691 |
| 12,057,908 | B2 * | 8/2024 | Qureshi | H04B 7/086 |
| 2009/0213955 | A1 * | 8/2009 | Higuchi | H04B 7/0669 |
| | | | | 375/267 |
| 2012/0230380 | A1 * | 9/2012 | Keusgen | H04B 7/0695 |
| | | | | 375/227 |
| 2013/0301454 | A1 * | 11/2013 | Seol | H04B 7/0456 |
| | | | | 370/252 |
| 2017/0163327 | A1 * | 6/2017 | Yang | H04B 7/0413 |
| 2017/0331531 | A1 * | 11/2017 | Wu | H04B 7/0469 |
| 2017/0366242 | A1 * | 12/2017 | Lee | H01Q 3/24 |
| 2018/0006706 | A1 * | 1/2018 | Cheng | H04W 72/23 |
| 2018/0262253 | A1 * | 9/2018 | Rahman | H04B 7/0478 |
| 2019/0081682 | A1 * | 3/2019 | Wu | H04B 7/0617 |
| 2019/0115963 | A1 * | 4/2019 | Zhu | H04B 7/0617 |
| 2019/0132031 | A1 * | 5/2019 | Park | H04B 7/0626 |
| 2019/0253181 | A1 * | 8/2019 | Rahman | H04B 17/309 |
| 2019/0312623 | A1 * | 10/2019 | Park | H04B 7/06 |
| 2019/0386727 | A1 * | 12/2019 | Jeon | H04B 7/088 |
| 2020/0083938 | A1 * | 3/2020 | Park | H04L 5/0051 |
| 2020/0280362 | A1 * | 9/2020 | Garcia | H04B 7/0617 |
| 2020/0304233 | A1 * | 9/2020 | Garcia | H04W 28/12 |
| 2020/0329509 | A1 * | 10/2020 | Jalali | H04W 24/08 |
| 2021/0058126 | A1 * | 2/2021 | Park | H04B 7/0456 |
| 2021/0058131 | A1 * | 2/2021 | Zhu | H04B 7/0478 |
| 2022/0070894 | A1 * | 3/2022 | Parkvall | H04B 7/06952 |
| 2022/0200146 | A1 * | 6/2022 | Du | H01Q 3/36 |
| 2022/0271809 | A1 * | 8/2022 | Raghavan | H04B 7/088 |
| 2023/0069488 | A1 * | 3/2023 | Chavez | H04B 7/0854 |
| 2023/0379017 | A1 * | 11/2023 | Kim | H04B 7/0456 |
| 2024/0077598 | A1 * | 3/2024 | Delude | G01S 15/8954 |
| 2024/0187067 | A1 * | 6/2024 | Rahman | H04B 7/0478 |
| 2024/0195476 | A1 * | 6/2024 | Cezanne | H04W 28/0215 |
| 2024/0333367 | A1 * | 10/2024 | AlAmmouri | H04B 7/0456 |
| 2025/0007575 | A1 * | 1/2025 | Sohrabi | H04B 7/0456 |
| 2025/0119186 | A1 * | 4/2025 | Venugopal | H04L 5/0048 |

OTHER PUBLICATIONS

Song et al., Distributed Hybrid Beamforming for Mmwave Cell-Free Massive MIMO, IEEE International Conference on Acoustics, Speech and Signal Processing (ICASSP), May 23-27, 2022, pp. 5373-5377.

Hu et al., "Channel Covariance Matrix Estimation via Dimension Reduction for Hybrid MIMO MmWave Communication Systems", Sensors, vol. 19, No. 15, Jul. 31, 2019, pp. 1-20.

Prasanna et al., "mmWave Channel Estimation via Compressive Covariance Estimation: Role of Sparsity and Intra-Vector Correlation", IEEE Transactions on Signal Processing, vol. 69, Apr. 13, 2021, pp. 2356-2370.

Park et al., "Spatial Channel Covariance Estimation for Hybrid Architectures Based on Tensor Decompositions", IEEE Transactions on Wireless Communications, vol. 19, No. 02, Feb. 2020, pp. 1084-1097.

Molisch et al., "Hybrid Beamforming for Massive MIMO—A Survey", arXiv, Apr. 30, 2017, pp. 1-13.

Dilli, "Performance analysis of multi user massive MIMO hybrid beamforming systems at millimeter wave frequency bands", Wireless Networks, vol. 27, Feb. 4, 2021, pp. 1925-1939.

Yang et al., "On the Uplink Transmission of Extra-large Scale Massive MIMO Systems", arXiv, Nov. 9, 2020, pp. 1-15.

Office action received for corresponding Finnish Patent Application No. 20245905, dated Feb. 26, 2025, 9 pages.

Attiah et al., "Deep Learning for Channel Sensing and Hybrid Precoding in TDD Massive MIMO OFDM Systems", arXiv, Jun. 29, 2022, pp. 1-15.

Ahmed et al., "A Survey on Hybrid Beamforming Techniques in 5G: Architecture and System Model Perspectives", IEEE Communications Surveys & Tutorials, vol. 20, No. 04, Fourthquarter, 2018, pp. 3060-3097.

Extended European Search Report received for corresponding European Patent Application No. 25189248.5, dated Oct. 15, 2025, 8 pages.

Sohrabi et al., "Hybrid Analog and Digital Beamforming for mmWave OFDM Large-Scale Antenna Arrays", IEEE Journal on Selected Areas in Communications, vol. 35, No. 07, Jul. 2017, pp. 1432-1443.

* cited by examiner 100
102

200

600

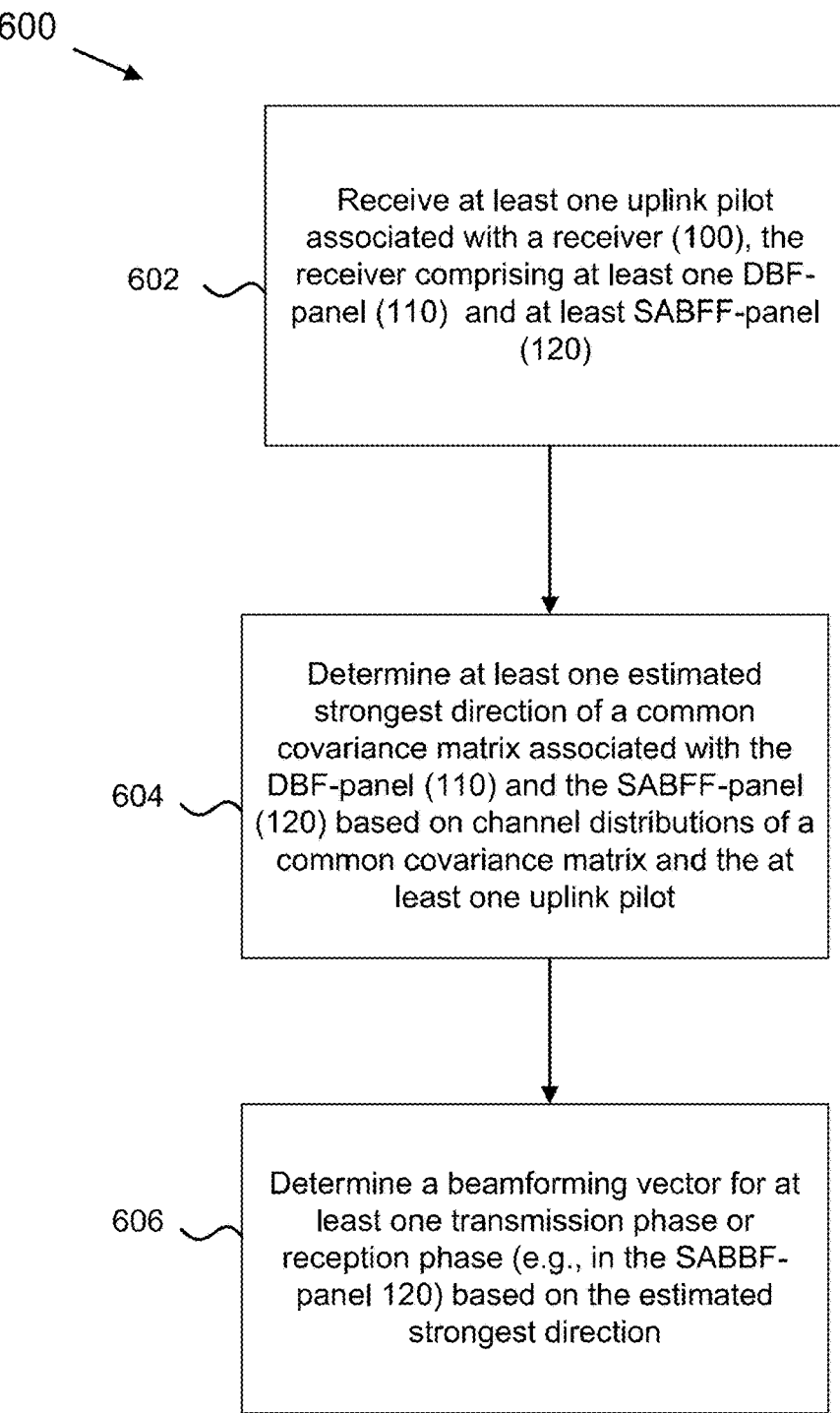

602 — Receive at least one uplink pilot associated with a receiver (100), the receiver comprising at least one DBF-panel (110) and at least SABFF-panel (120)

604 — Determine at least one estimated strongest direction of a common covariance matrix associated with the DBF-panel (110) and the SABFF-panel (120) based on channel distributions of a common covariance matrix and the at least one uplink pilot 606 — Determine a beamforming vector for at least one transmission phase or reception phase (e.g., in the SABBF-panel 120) based on the estimated strongest direction

MIXED DIGITAL AND SUBARRAY-BASED BEAMFORMER

RELATED APPLICATION

This application claims benefit of priority from Finnish Patent App. No 20245905, filed Jul. 18, 2024, the disclosure of which is hereby incorporated in its entirety by reference herein.

TECHNICAL FIELD

The disclosure relates generally to wireless communications and, more particularly but not exclusively, to a massive multiple-input multiple output (MIMO) subarray-based beamforming receiver.

BACKGROUND

Massive multiple-input multiple-output (MIMO) devices such as transceivers, receivers and/or transmitters with a very large array size e.g., 1000 antenna elements or more is essential for future wireless communication networks to support high capacity, high throughput and good coverage. One of the power efficient architectures to realize such massive MIMO systems is using hybrid analog and digital beamforming.

Two examples of hybrid beamforming (HBF) architectures are the fully-connected HBF architecture, wherein each radio frequency (RF) chain is connected to all antenna elements via network of phase shifters and a partially-connected (sub-array based) HBF architecture, wherein each RF chain is connected to a sub-array of antennas with much lower insertion loss.

Analog beamformer (i.e., phase shifters) of a HBF architecture is typically designed based on long-term statistics of a channel between a receiver and a transmitter, such as covariance matching, however, accurate information about long-term statistics, such as a covariance matrix, may not be available in a practical setting.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect, there is provided an apparatus comprising: at least one processor; and at least one memory storing instructions which, when executed by the at least one processor, cause the apparatus at least to: receive at least one uplink pilot associated with a receiver, wherein the at least one uplink pilot is transmitted over at least one time-frequency unit, and wherein the receiver comprises at least one digital beamforming, DBF, -panel and at least one subarray-based beamforming, SABBF, -panel, the at least one DBF-panel having an associated DBF-channel and the at least one SABBF-panel having an associated SABBF-channel; based on channel distributions of the DBF-channel and the SABFF-channel and further based on the at least one uplink pilot, determine at least one estimated strongest direction of a common covariance matrix associated with the at least one DBF-panel and the at least one SABBF-panel; and determine a beamforming vector for at least one transmission phase or at least one reception phase based on the at least one estimated strongest direction of the common covariance matrix.

In an example embodiment of the first aspect, the at least one estimated strongest direction of the common covariance matrix comprises an eigenvector corresponding to a strongest eigenvalue of the common covariance matrix.

In an example embodiment of the first aspect, the instructions, when executed by the at least one processor, further cause the apparatus at least to: determine a plurality of candidates for a strongest direction of the common covariance matrix; and determine the at least one estimated strongest direction of the common covariance matrix further based on the plurality of candidates.

In an example embodiment of the first aspect, the plurality of candidates for the strongest direction of the common covariance matrix comprises an oversampled Discrete Fourier Transform, DFT, matrix.

In an example embodiment of the first aspect, the instructions, when executed by the at least one processor, further cause the apparatus at least to: based on the plurality of candidates and the at least one uplink pilot, determine a plurality of signal metrics, wherein each signal metric from the plurality of signal metrics is associated with one from the plurality of candidates; and determine the at least one estimated strongest direction of the common covariance matrix further based on the determined plurality of signal metrics.

In an example embodiment of the first aspect, the plurality of signal metrics is determined based at least partially on an inner product between the plurality of candidates and the at least one uplink pilot.

In an example embodiment of the first aspect, the instructions, when executed by the at least one processor, further cause the apparatus at least to: determine a common direction for more than one user a received uplink pilot is associated with; and determine the beamforming vector further based on the determined common direction.

In an example embodiment of the first aspect, the instructions, when executed by the at least one processor, further cause the apparatus at least to: determine at least one user specific direction for at least one user the at least one uplink pilot is associated with; and determine the beamforming vector further based on the at least one user specific direction.

In an example embodiment of the first aspect, the instructions, when executed by the at least one processor, further cause the apparatus at least to: perform at least a portion of the determination of the at least one estimated strongest direction of the common covariance matrix by utilizing a first deep neural network, DNN.

In an example embodiment of the first aspect, the instructions, when executed by the at least one processor, further cause the apparatus at least to: perform a combination phase of each subarray in the at least one SABFF-panel by utilizing a second DNN.

In an example embodiment of the first aspect, at least a portion of the at least one estimated strongest direction of the common covariance matrix is based on a substantial sparsity of the at least one DBF-channel and the at least one SABBF-channel.

According to a second aspect, there is provided a receiver comprising: the apparatus according to the first aspect; the at least one DBF-panel; and the at least one SABBF-panel.

According to a third aspect, there is provided a network node device comprising the receiver according to the second aspect.

According to a fifth aspect, there is provided a method comprising: receiving at least one uplink pilot associated with a receiver, wherein the at least one uplink pilot is transmitted over at least one time-frequency unit, and wherein the receiver comprises at least one digital beamforming, DBF, -panel and at least one subarray-based beamforming, SABBF, -panel, the at least one DBF-panel having an associated DBF-channel and the at least one SABBF-panel having an associated SABBF-channel; based on channel distributions of the DBF-channel and the SABFF-channel and further based on the at least one uplink pilot, determining at least one estimated strongest direction of a common covariance matrix associated with the at least one DBF-panel and the at least one SABBF-panel; and determining a beamforming vector for at least one transmission phase or at least one reception phase based on the at least one estimated strongest direction of the common covariance matrix.

According to a sixth aspect, there is provided a computer program comprising instructions causing an apparatus to perform the method according to the fifth aspect.

According to a seventh aspect, there is provided an apparatus comprising at least: means for receiving at least one uplink pilot associated with a receiver, wherein the at least one uplink pilot is transmitted over at least one time-frequency unit, and wherein the receiver comprises at least one digital beamforming, DBF, -panel and at least one subarray-based beamforming, SABBF, -panel, the at least one DBF-panel having an associated DBF-channel and the at least one SABBF-panel having an associated SABBF-channel; means for determining at least one estimated strongest direction of a common covariance matrix associated with the at least DBF-panel and the at least one SABFF-panel based on channel distributions of the DBF-channel and the SABFF-channel and further based on the at least one uplink pilot; and means for determining a beamforming vector for at least one transmission phase or at least one reception phase based on the at least one estimated strongest direction of the common covariance matrix.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings:

FIG. 6 illustrates a method according to an example embodiment.

Like reference numerals are used to designate like parts in the accompanying drawings.

DETAILED DESCRIPTION

Figure 1:
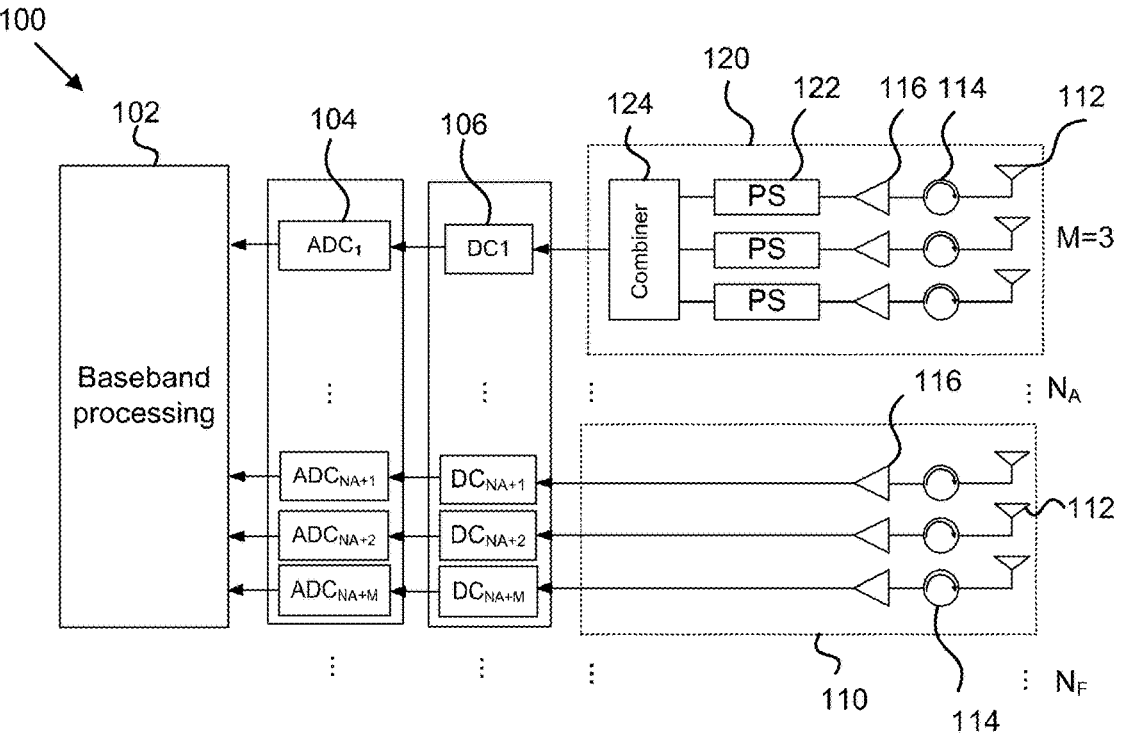
FIG. 1 illustrates a receiver according to an example embodiment.

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Massive multiple input-multiple output (MIMO) with very large array size (e.g., 1000 antenna elements or more) may be essential for future wireless communications. One power-efficient architecture is a hybrid analog and digital beamforming architecture, in which an overall beamformer comprises of a lower-dimensional digital beamformer (DBF) and a higher-dimensional analog beamformer (ABF) typically implemented using simple analog components such as adders/splitters and phase shifters (PSs), which may be identical for all subcarriers within a typical bandwidth. To optimize channel state information (CSI) acquisition overhead, purely digital beamforming architectures may be configured based on short term statistics, such as channel state information (CSI) or the like however, analog beamformers may be configured based on long-term statistics of the channel such as channel covariance matrix. It will be noted that in the context of the disclosure, an ABF may comprise a portion of a hybrid beamformer (HBF), such as a subarray-based beamformer (SABBF) panel.

One way to obtain CSI in time-division duplex (TDD) massive MIMO systems is performing uplink (UL) channel training in which a user (e.g., user equipment, UE)) sends one or more uplink pilot signals, such as sounding reference signal (SRS) and a base station obtains required CSI based on the received UL pilots. The UL pilots may be used to estimate the channel covariance matrix for designing the ABF portion of the HBF.

Other way to obtain the CSI, applicable both in TDD and frequency division duplex (FDD), is where the base station broadcasts downlink (DL) pilots, such as CSI-RS (CSI reference signal), via DL channels, then each user feeds back and estimated CSI to the base station via dedicated UL channels. The estimated CSI may be used to estimate the channel covariance matrix for designing the ABF. It is also possible to use a combination of both UL and DL channel training to obtained CSI for designing the ABF.

Two examples of HBF-architectures may be used in a HBF MIMO system. One is a fully-connected HBF, wherein each radio frequency (RF) chain is connected to all antenna elements via a network of phase shifters, and the other is partially-connected (subarray-based) HBF architecture. The subarray-based HBF architecture may reduce insertion loss from the network of phase shifters/combiners by connecting each RF chain to a subarray of antennas.

CSI acquisition for HBF may be difficult, as the base station has access only to the beamformed (i.e., reduced-dimension) received pilots after analog combining procedure, furthermore, the degrees of freedom for analog combining are much smaller in the subarray-based HBF, further increasing the difficulty of finding the optimal beamforming configuration.

In the following, various example embodiments will be discussed. At least some of these example embodiments described herein may disclose a solution in which a receiver comprising multiple hybrid beamforming panels, and at least one fully-digital beamforming panel obtains/receives one or more uplink pilots, and based on, at least partially, similarities in channel distributions of a common covariance matrix associated with each panel and the one or more uplink pilots, an estimated strongest direction of the common covariance matrix (for example an eigenvector corresponding to the largest eigenvalue of the common covariance matrix) is determined. Furthermore, a beamforming vector for (subsequent) transmission (or reception) phases (e.g., PUCCH/PUSCH, PDCCH/PDSCH) may be determined based on the estimated strongest direction of the common covariance matrix.

The common covariance matrix may comprise, for example, a data matrix comprising an (estimated) covariance matrix for each panel in a receiver, such as receiver 100 illustrated in FIG. 1 (or for each panel in a transmitter) and 'similarities in channel distributions of the common covariance matrix' may comprise, for example, that the common covariance matrix is considered symmetrical, or that channel distributions, such as a mean value and/or a covariance value of each covariance matrix of a panel may be considered to have a value/values that are close (enough) to each other as to consider the long-term behaviour of each panel identical (e.g., channel parameters in long-term are to be considered identical).

FIG. 1 illustrates receiver 100 according to an example embodiment. Receiver 100 may comprise a baseband processing block 102, one or more analog-to-digital converters 104 (ADC 104) and one or more RF-to-baseband downconverters 106 (DC 106). Furthermore, receiver 100 may comprise at least one digital beamforming panel 110 (DBF-panel 110) (for example $N_F$ panels out of N panels in FIG. 1), wherein at least one DBF-panel 110 may comprise an antenna 112, a circulator 114 and a low-noise amplifier 116 (LNA 116) for each RF chain.

Receiver 100 may further comprise at least one subarray-based beamforming panel 120 (SABBF-panel 120) comprising one or more antennas 112, one or more circulators 114 and one or more LNA's 116. At least one SABBF-panel 120 may comprise an analog beamformer. The analog beamformer may combine (using combiner 124) phase shifted (using phase shifters 122) version of received signals at one or more antennas 112 of the SABBF-panel.

Furthermore, at least one SABBF-panel 120 may comprise one or more phase shifters 122 and at least one combiner 124, wherein at least one combiner is used to sum signal(s) received by each antenna 112 in at least one SABBF-panel 120 to represent a single RF-chain for at least one SABBF-panel 120. Number of subarrays for at least one SABFF-panel 120 is illustrated in FIG. 1 as three (i.e., M=3), however, any suitable integer number of M may be chosen.

Furthermore, referring to FIG. 1, in practice, receiver 100 may comprise $N_A$ (integer) number of SABBF-panels 120 and $N_F$ (integer) number of DBF-panels 110 and each SABBF-panel 120 may comprise M (integer) number of subarrays and each DBF-panel 110 may comprise M number of (digital) elements. Therefore, the total number of panels, N, can be considered as $N=N_A+N_F$ and the total number of RF chains would be considered $N_A+N_F*M$.

Furthermore, it will be noted, that receiver 100 may comprise only a small number (e.g., one to four) of DBF-panels 110 and a much larger number (e.g., 64, 128 etc.) of SABBF-panels 120.

One advantage of the disclosure is that, only a small number of DBF-panels 110 may be required, providing superior power-efficiency compared to, for example, a fully-digital solution. Furthermore, once a beamforming vector is determined, the disclosure allows disabling any (all) DBF-panels 110 to further increase power-efficiency.

Figure 2:
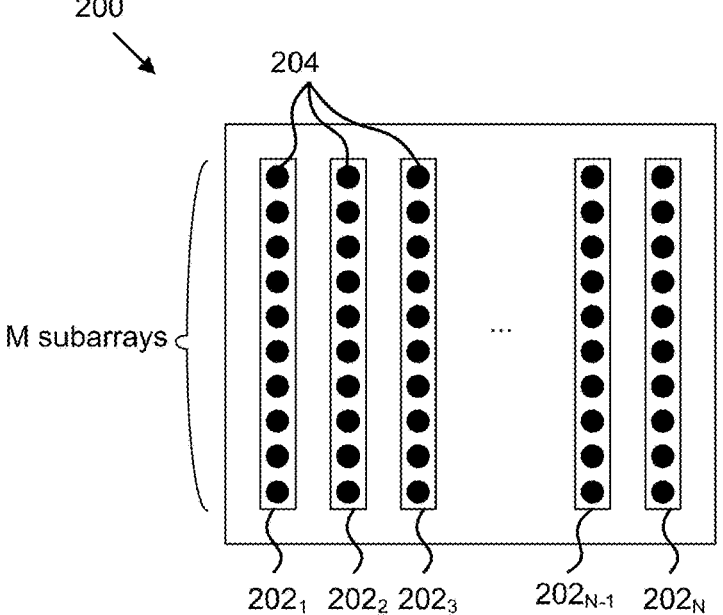
FIG. 2 illustrates an antenna array according to an example embodiment.

FIG. 2 illustrates an example embodiment of antenna array 200, which receiver 100 of FIG. 1 may comprise. Antenna array 200 may comprise one or more panels $202_{1-N}$, each panel 202 comprising one or more antenna elements 204 or. In other words, panel 202 may comprise DBF-panel 110 of FIG. 1, or panel 202 may comprise SABBF-panel 120 of FIG. 1 and one antenna element 204 is assigned for each subarray of SABBF-panel 120 or for each RF-chain of DBF-panel 110. Antenna element 204 may comprise antenna 112.

Each panel 202 may be configured for receiving operations and/or transmitting operations, for example. In other words, circulator 114 illustrated in FIG. 1 may be controlled to switch an antenna element 204 (or antenna 112) between a transmitting mode and a receiving mode (i.e., provide insulation between a transmitter and a receiver).

It can be demonstrated that channel distribution of covariance matrices of one or more panels $202_{1-N}$ are substantially similar, at least when considering a far-field example, where a user would consider each panel to be at a same distance. In other words, a covariance matrix of a whole channel (e.g., between a user equipment and a base station) comprises a covariance matrix for each panel 202, and covariance matrices of each panel are substantially similar to each other in terms of channel distributions, such as a mean value and/or a covariance value.

Figure 3:
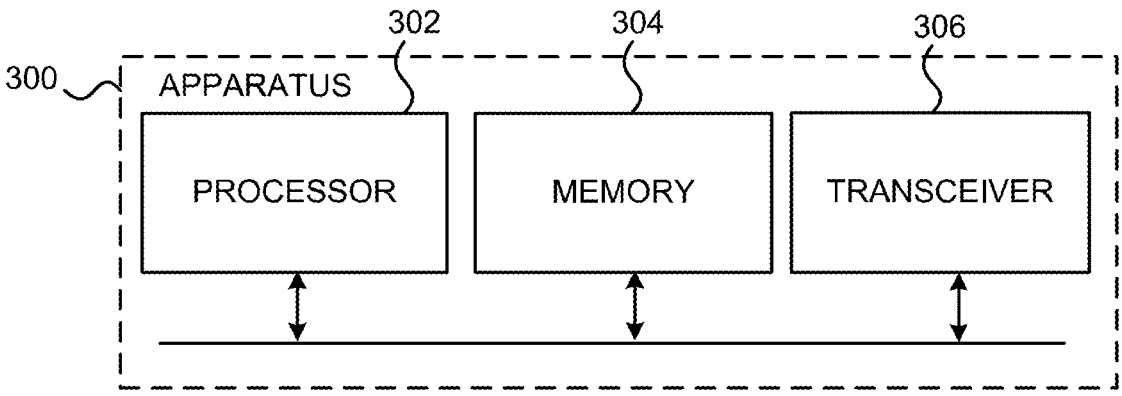
FIG. 3 illustrates an apparatus according to an example embodiment.

FIG. 3 illustrates apparatus 300 configured to practice example embodiments. Apparatus 300 may comprise at least one processor 302 and at least one memory 304 comprising program code (in other words, instructions).

Apparatus 300 may also include other elements, such as at least one transceiver 306. Transceiver 306 may be configured to enable apparatus 300 to transmit and/or receive information to/from other devices, as well as other elements not shown in FIG. 3. In one example, apparatus 300 may use the transceiver to transmit or receive signalling information and data in accordance with at least one cellular communication protocol. Transceiver 306 may be configured to provide at least one wireless radio connection, such as for example a 3GPP mobile broadband connection (for example, 5G or 6G). Transceiver 306 may comprise, or be configured to be coupled to, at least one antenna to transmit and/or receive radio frequency signals. In an example embodiment, transceiver 306 may comprise receiver 100, and transceiver 306 may further comprise a transmitter (not shown in FIG. 3).

Furthermore, apparatus 300 may include a communication interface other than transceiver 306 (not shown in FIG. 3) for exchanging information with, for example, receiver 100 (to receive/obtain uplink pilots).

It will be noted, that in some embodiments, receiver 100 may be comprised in apparatus 300 (e.g., receiver 100 may be comprised in transceiver 306) or in another aspect, it could be considered that apparatus 300 and receiver 100 are comprised in a same device. An example of such a device would comprise, for example, a $5^{th}$ generation base station (gNB). In some embodiments, apparatus 300 may comprise a separate entity, such as a server or a cloud device performing disclosed operations, e.g., mathematical operations, wherein transceiver 306 would comprise a Wi-Fi interface or the like and apparatus 300 may exchange disclosed information to configure a base station comprising receiver 100.

Although apparatus 300 is depicted to include only one processor 302, apparatus 300 may include more than one processor. In an embodiment, at least one memory 304 is capable of storing instructions, such as an operating system and/or various applications. Furthermore, at least one memory 304 may include a storage that may be used to store, for example, at least some of the information and data used in the disclosed embodiments.

Furthermore, at least one processor 302 is capable of executing the stored instructions. In an embodiment, at least one processor 302 may be embodied as a multi-core processor, a single core processor, or a combination of one or more multi-core processors and one or more single core processors. For example, at least one processor 302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, a neural network (NN) chip, an artificial intelligence (AI) accelerator, a tensor processing unit (TPU), a neural processing unit (NPU), or the like. In an embodiment, at least one processor 302 may be configured to execute hard-coded functionality. In an embodiment, at least one processor 302 is embodied as an executor of software instructions, wherein the instructions may specifically configure at least one processor 302 to perform the algorithms and/or operations described herein when the instructions are executed.

Transceiver 306 may be configured to provide at least one wireless radio connection, such as for example a 3GPP mobile broadband connection (for example, 5G or beyond). Transceiver 226 may comprise, or be configured to be coupled to, at least one antenna to transmit and/or receive radio frequency signals.

At least one memory 304 may be embodied as one or more volatile memory devices, one or more non-volatile memory devices, and/or a combination of one or more volatile memory devices and non-volatile memory devices. For example, at least one memory 304 may be embodied as semiconductor memories (such as mask ROM, PROM (programmable ROM), EPROM (erasable PROM), flash ROM, RAM (random access memory), etc.).

Apparatus 300 may be comprised in a base station, a transmission reception point, TRP, and/or a relay node. The base station may include, for example, a 5G or 6G base station (gNB) or any such device providing an air interface for a user equipment to connect to a wireless network via wireless transmissions.

In an example embodiment of apparatus 300, when executed by at least one processor 302, instructions stored in at least one memory 304 may cause apparatus 300 at least to receive (or obtain) at least one uplink pilot associated with a receiver (e.g., receiver 100), wherein the at least one uplink pilot is transmitted over at least one time-frequency unit, and wherein the receiver comprises at least one digital beamforming, DBF, -panel (DBF-panel 110) and at least one subarray-based beamforming, SABBF, -panel (SABBF-panel 120), the at least one DBF-panel having an associated DBF-channel and the at least one SABBF-panel having an associated SABBF-channel. The at least one time-frequency unit may comprise, for example, at least one physical resource block (PRB) and at least one time slot (e.g., OFDM symbol etc.) of a radio transmission.

Furthermore, in the above example embodiment of apparatus 300, based on channel distributions of the DBF-channel and the SABFF-channel and further based on the at least one uplink pilot, the instructions, when executed by at least one processor 302 may further cause apparatus 300 at least to determine at least one estimated strongest direction of a common covariance matrix associated with the at least one DBF-panel and the at least one SABBF-panel.

As discussed above, channel distributions of covariance matrices of each panel of an antenna array (such as antenna array 200) may be considered being (substantially) similar, therefore the common covariance matrix may be determined to represent a full channel. Or in another aspect, a single panel covariance matrix may be considered to represent the full channel. In other words, 'based on channel distributions . . . ' may comprise, that the determination of the estimated strongest direction of the common covariance matrix is 'based on (substantial) similarities in channel distributions'.

The at least one estimated strongest direction of the common covariance matrix may be obtained from, for example, a plurality of candidates for a strongest direction of the common covariance matrix, wherein the plurality of candidates for the strongest direction may comprise an oversampled Discrete Fourier Transform, DFT, matrix. A single candidate for the strongest direction may comprise for example, a beamforming vector (i.e., steering vector). For example, if the common covariance matrix is of dimension M×M, the beamforming vector can be any complex vector of dimension M×1, while satisfying a required set of constraints. For example, the required set of constrains may comprise a set of power constraints. For example, the set of power constraints may comprise the total power constraint. For example, the required set of constraints may further comprise a set of structural constraints. For example, a set of structural constraints may comprise a set of constant modulus norm constraints. For example, the constant modulus norm constraint may be caused by using phase shifters to realize the beamforming vector.

The plurality of candidates for the strongest direction may be determined by apparatus 300. In some embodiments, they may be obtained by apparatus 300 from another apparatus.

The at least one estimated strongest direction may comprise an eigenvector corresponding to a strongest eigenvalue of the common covariance matrix. In other example, the at least one estimated strongest direction may comprise a vector satisfying a set of required constraints and is closest to the eigenvector corresponding to a strongest eigenvalue of the common covariance matrix. The set of required constraints may comprise a set of constant modulus constraints due to realizations with analog phase shifters. The closest vector to a second vector may be obtained by finding the vector that has the largest inner products with the second vector. It will be noted that the word 'strongest' in the context of 'estimated strongest direction' means, that the direction is not necessarily the absolute strongest direction, but rather, it is estimated to be sufficiently strong as to represent an estimation for the strongest direction.

Even furthermore, in the above example embodiment of apparatus 300, the instructions, when executed by at least one processor 302 may further cause apparatus 300 at least to determine a beamforming vector for at least one transmission phase or at least one reception phase based on the at least one estimated strongest direction of the common covariance matrix. The beamforming vector may be determined, for example, for at least one SABBF-panel 120. It will be noted that the beamforming vector may be determined for phase shifters in at least one SABBF-panel 120, for example, and/or for (an analog) beamformer in a transmitter.

In other words, beamforming may be determined only for SABBF-panels 120, as the disclosure enables disabling any DBF-panel 110 to, for example, increase power efficiency. However, the scope of the claims of this disclosure does not fall out of scope in such embodiments, where beamforming is determined for each at least one DBF-panel 110 and for each at least one SABBF-panel 120. The beamforming vector may be determined for more than one (subsequent) Transmission/reception (Tx/Rx) phases, or it can be calibrated each time an uplink pilot is received/obtained.

The determined beamforming vector may comprise, for example, phase values for each phase shifter 122 in receiver 100 or phase values for each phase shifter in a transmitter that is comprised in a same device receiver 100 is comprised in (e.g., a network node device).

In an example embodiment of apparatus 300, the instructions, when executed by at least one processor 302, may further cause apparatus 300 at least to determine a plurality of candidates for the strongest direction of the common covariance matrix. As described above, the plurality of candidates may be determined by apparatus 300, or they might be obtained/received from another device. The plurality of candidates for the strongest direction of the common covariance matrix may comprise a set of beamforming vectors, for example the set of beamforming vectors may be obtained for an oversampled DFT matrix. In other words, the plurality of candidates may comprise an oversampled DFT matrix. Furthermore, in the example embodiment, the instructions, when executed by at least one processor 302, may further cause apparatus 300 at least to determine the at least one estimated strongest direction of the common covariance matrix further based on the plurality of candidates.

In an example related to the previous example embodiment, an inner product operation between the at least one uplink pilot and the plurality of candidates may be performed. This operation may yield a result representing signal strength in the direction of each candidate. A more detailed example is given in reference to FIGS. 4 and 5A.

In an example embodiment of apparatus 300, based on the plurality of candidates and the at least one uplink pilot, the instructions, when executed by at least one processor 302, may further cause apparatus 300 at least to determine a plurality of signal metrics, wherein each signal metric from the plurality of signal metrics is associated with one from the plurality of candidates, and estimate the at least one strongest direction of the common covariance matrix further based at least partially on the determined plurality of signal metrics. Each signal metric may represent signal strength in the direction of the candidate it is associated with, for example, the plurality of signal metrics may be determined based at least partially on an inner product between the plurality of candidates and the at least one uplink pilot.

In an example embodiment of apparatus 300, the instructions, when executed by at least one processor 302, may further cause apparatus 300 at least to determine a common direction for more than one the at least one uplink pilot is associated with and determine the beamforming vector further based on the common direction.

The common direction for more than one user may be determined by, for example, determining a normalized single user covariance matrix for each associated user (i.e., each uplink pilot is associated to a user), and summing the single user covariance matrices together to obtain a normalized panel covariance matrix, and the beamforming for the at least one SABBF-panel (and/or the at least one DBF-panel) may be determined based on an estimated strongest support of all users by, for example, estimating an eigenvector corresponding to a strongest eigenvalue of the normalized panel covariance matrix. In other words, the normalized panel covariance matrix comprises the common covariance matrix.

In other words, a "good" beamformer is constructed for all users based on the strongest direction of the common covariance matrix of each user. I.e., the common covariance matrix comprises a panel covariance matrix for all users an uplink pilot is associated with and the panel covariance matrix for all users is based on an estimated strongest direction of a common covariance matrix of each user an uplink pilot is associated with. More specific example of this is given in reference to FIG. 5A and Eq. 9.

In an example embodiment of apparatus 300, the instructions, when executed by at least one processor 302, may further cause apparatus 300 at least to determine a user specific direction for at least one user the at least one uplink pilot is associated with and determine the beamforming vector further based on the user specific direction.

In other words, one or more panels may be associated with (i.e., assigned to) one user, and the beamforming for each SABBF-panel 120 can be determined/designed based on a covariance matrix of associated users. For example, in an extreme case where each panel (i) is associated with only one user (k), then the beamforming for panel i can be designed by solving a problem presented in Eq. 4.

In even other words, a user specific direction may be determined by, for example, associating one or more panels with a user an uplink pilot is obtained/received from (i.e., associated with) and determining the normalized single user covariance matrix for the associated user (e.g., if two panels are associated with the user, the single user covariance matrix may comprise, for example, an average of two panel covariance matrices), and the user specific direction may be determined by, for example, estimating an eigenvector corresponding to a strongest eigenvalue of the normalized single user covariance matrix (i.e., the common covariance matrix comprises the single user covariance matrix).

In an example embodiment of apparatus 300, as a clarification to the above embodiment, the instructions, when executed by at least one processor 302, may further cause apparatus 300 at least to: associate at least one panel from the at least one SABBF-panel and the at least one DBF-panel to each user an uplink pilot is associated with; determine an estimated strongest direction of a covariance matrix of the at least one panel a user is associated with; and determine a beamforming vector for the at least one panel a user is associated with. I.e., this embodiment describes the above embodiment in other words.

In an example embodiment of apparatus 300, the instructions, when executed by at least one processor 302, may further cause apparatus 300 at least to perform at least a portion of the determination of the at least one estimated strongest direction of the common covariance matrix by utilizing a first deep neural network, DNN.

For example, the plurality of signal metrics described above may be provided to the first DNN, wherein the first DNN may be trained to provide beamforming for at least one SABBF-panel 120 as, for example, phase values for each phase shifter 122 in at least one SABFF-panel 120 or as a complex rotation vector comprising complex plane rotation value (e.g., $e^{j\theta}$) for each phase shifter 122 in at least one SABBF-panel 120, as a response to an input of signal metrics. In another example, the first DNN may be provided the plurality of candidates for the strongest direction of the common covariance matrix and the at least one uplink pilot, and the first DNN may be trained to provide (or determine) the beamforming for the at least one SABFF-panel 120 based on the plurality of candidates and the at least one uplink pilot.

In an example embodiment of apparatus 300, the instructions, when executed by at least one processor 302, may further cause apparatus 300 at least to perform a combination phase of each subarray in the at least one SABFF-panel by utilizing a second DNN. Combiner 124 may be, for example, a collection of estimated weights (e.g. a matrix), which is used to estimate the effect of combiner 124 to an input signal (i.e., the at least one uplink pilot), however, in this example, the effect of combiner 124 to an input signal may be replaced by the second DNN, wherein the second DNN may be trained to approximate combiner 124 response more accurately, than a collection of weights.

In an example embodiment of apparatus 300, at least a portion of the at least one estimated strongest direction of the common covariance matrix is based on a sparsity of the at least one DBF-channel and the at least one SABBF-channel.

Channel estimation is critical in massive MIMO and for example, spatial sparsity and/or temporal sparsity of a channel can be used to estimate channel properties. In the case of spatial sparsity, multipath channel between transmitter and a receiver only involves paths in a limited subset of angular directions and if the directions are known beforehand, channel properties such as phase and amplitude can be estimated in the limited subset of angular directions. In the case of temporal sparsity, channel's impulse response comprises one or several pulses with zeroes in between, whereas each pulse may represent a different path in a multipath environment characterized by non-overlapping time delays.

Figure 4:
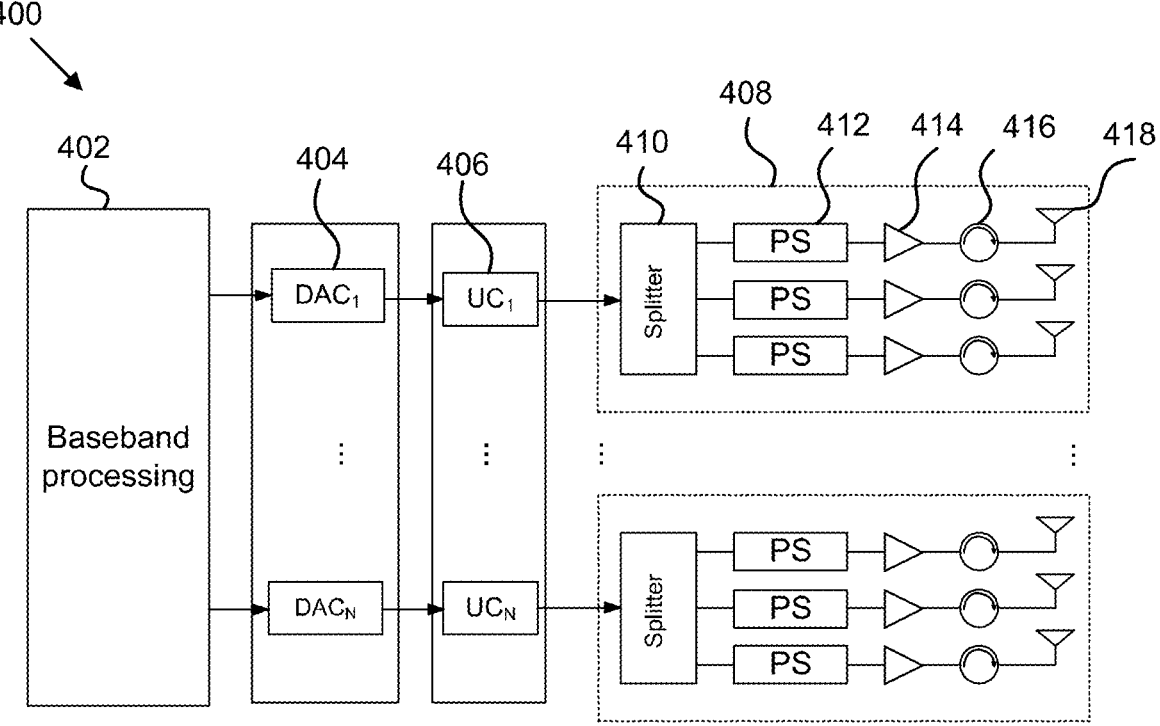
FIG. 4 illustrates a hybrid subarray-based beamforming transmitter configured at least partially to practice example embodiments.

FIG. 4 illustrates an example of a partially connected hybrid beamforming transmitter architecture 400 (PC-HBF 400). PC-HBF 400 comprises baseband processing block 402, digital-to-analog converter 404 (DAC 404) for each RF-chain and upconverter block 406 (UC 406) for each RF-chain. PC-HBF 400 further comprises a subarray-based beamforming panel 408 comprising a splitter 410, one or more phase shifters 412, one or more LNA's 414, one or more circulators 416 and one or more antennas 418 for each subarray.

Since in PC-HBF 400, each RF chain is connected only to one subarray with M antenna (M=3 in the example of FIG. 4), an analog beamforming matrix comprises a diagonal format as follows:

$$V_{RF} = \frac{1}{\sqrt{M}} \begin{bmatrix} v_1 & 0 & 0 & 0 \\ 0 & v_2 & 0 & 0 \\ 0 & 0 & ... & 0 \\ 0 & 0 & 0 & v_N \end{bmatrix}. \tag{1}$$

Analog beamformer is realized by phase shifters 412 satisfying constant modulus constraint $|v_n(i)|=1$, therefore each element in the analog beamforming matrix $V_{RF}$ is:

$$v_n = \begin{bmatrix} e^{j\theta_{n1}} \\ e^{j\theta_{n2}} \\ ... \\ e^{j\theta_{nM}} \end{bmatrix}, \tag{2}$$

where $\theta$ denotes the phase shift value of each phase shifter 412 in subarray-based beamforming panel 408.

Channel matrix between user k and a base station may be denoted as $H_k$ and since the analog precoder may comprise a post-inverse fast Fourier transform module, the analog precoder is considered identical/common for all subcarriers/subbands. To optimize CSI acquisition overhead, it is desirable to design the analog precoder based on long-term statistics of the channel, particularly channel covariance matrix.

A single user-case covariance matching scenario may be determined by using trace metric as follows:

$$\max_{V_{RF} \in \mathfrak{I}} \text{trace}\left(V_{RF}^H Q V_{RF}\right), \tag{3}$$

where $\mathfrak{I}$ denotes a feasibility set considering all constraints that an analog beamformer should satisfy, i.e., the architectural constraint as in Eq. 1 and the constant modulus constraint as in Eq. 2. Q denotes the channel covariance matrix between a single user (k) and the base station.

In a sub-array based HBF, the problem in Eq. 3 is equivalent to solving following N problems:

$$\max_{v_i \in \mathfrak{I}_2} \text{trace}\left(v_i^H Q_i v_i\right) \tag{4}$$

$$\forall i = 1, ... , N,$$

where $Q_i$ denotes covariance matrix of panel i.

Due to symmetry of channel covariance matrix (e.g., substantial similarities of channel distributions of the channel/common covariance matrix), same analog beams may be designed for different panels by solving the problem presented in Eq. 4. Furthermore, ignoring the constant modulus constraint in Eq. 2, an optimal beamforming for each panel may be given by an eigenvector corresponding to a largest eigenvalue of $Q_{panel}$, where $Q_{panel}=Q_i$, $\forall i=1, ... , N$. Therefore, it may be sufficient for analog beamform design purpose to simply estimate a strongest eigenvector of $Q_{panel}$.

Using the diversity in panel domain presented in FIG. 1 (i.e., receiver 100), a better estimate of panel covariance matrix may be obtained due to the utilization of few fully-digital panels (e.g., 1, 2, 4 etc.). Furthermore, only few uplink pilots may be required to maximize signal-to-noise ratio, SNR, of received signals, as the diversity in panel domain would compensate for diversity in frequency domain.

Figure 5A:
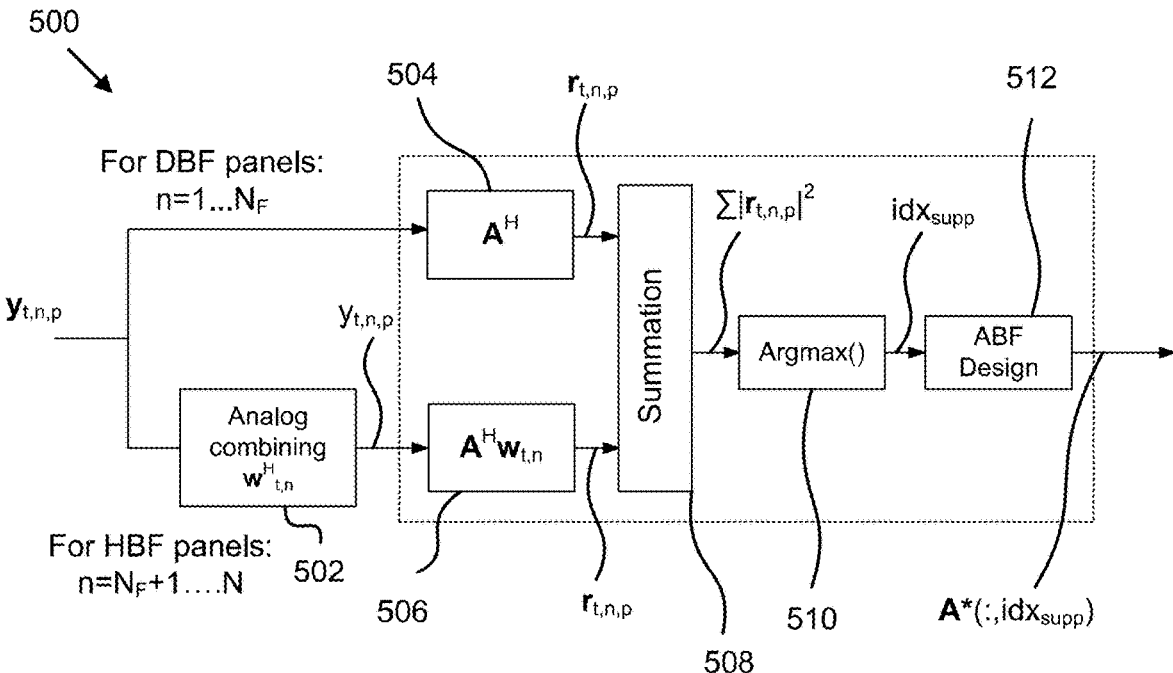
FIG. 5A illustrates a signal flow diagram according to an example embodiment.

FIG. 5A illustrates an example signal flow diagram 500 according to an example embodiment. Signal flow diagram 500 comprises a modified orthogonal matching pursuit (OMP) algorithm. The lower signal path illustrates, how at least one SABBF-panel 120 affects estimating/determining the at least one estimated strongest direction of the common covariance matrix and the upper signal path illustrates how at least one DBF-panel 110 affects estimating/determining the at least one estimated strongest direction of the common covariance matrix.

In FIG. 5A, considering a situation, where receiver 100 observes uplink pilots, $y_{t,n,p}$, from $N_F$ DBF-panels 110 and $N–N_F$ SABFF-panels 120, each uplink pilot observed by a DBF-panel 110 may be represented as follows:

$$y_{t,n,p} = \alpha \cdot h_{t,n,p} + z_{t,n,p} \qquad (5)$$

where:

$$t = 1, \dots , T.$$

$$n = 1, \dots N_F.$$

$$p = 1, \dots , N_{prb}^{UP} \le N_{prb}^{BW},$$

where $$N_{prb}^{UP}$$

is the number of pilots observed, t is a timestep of each observed pilot, and T is the total number of timesteps during which the uplink pilots are observed. Each uplink pilot observed by a SABBF-panel 120 may be represented as follows:

$$y_{t,n,p} = \alpha \cdot w_{t,n}^{H} h_{t,n,p} + n_{t,n,p} \qquad (6)$$

where:

$$t = 1, \dots , T$$

$$n = N_F + 1, \dots , N$$

$$p = 1, \dots , N_{prb}^{UP} \le N_{prb}^{BW}$$

and where:

$$\alpha = \sqrt{\frac{P_{UP}}{N_{prb}^{UP}}}$$

and where $$N_{prb}^{BW}$$

denotes a number of physical resource blocks (PRB's) over the entire bandwidth, where $h_{t,n,p}$ denotes the physical channel and where $z_{t,n,p}$ and $n_{t,n,p}$ are the noise characterizations of each uplink pilot over their respective channels.

$$w_{t,n}^{H}$$

may comprise the effect of analog combination at 502, which represents the effect of analog combination in a SABBF-panel (e.g., combiner 124).

A sparse channel model may be assumed, by, for example, substituting the physical channel as $h_{t,n,p} = Ax_{t,n,p}$, where $A \in \mathbb{C}^{M \times D}$, where $x_{t,n,p}$ comprises a sparse vector (e.g., multiple elements are zero) and A comprises the plurality of candidates for the strongest direction of the common covariance matrix, D is the number of candidates and M is the number of sub-arrays in at least one SABF-panel 120 and/or at least one DBF-panel 110 (or rather, number of RF-chains in at least one DBF-panel 110).

At 504 and 506, an inner product may be taken between the observations of each panel ($y_{t,n,p}$ and $y_{t,n,p}$) and the plurality of candidates (A) for the strongest direction to obtain a signal metric $r_{t,n,p}$ for each panel. The signal metric may be denoted as:

$$r_{t,n,p} = \begin{cases} A^{H} y_{t,n,p} \in \mathbb{C}^{D \times 1}, \, n \le N_F \\ A^{H} w_{t,n} y_{t,n,p} \in \mathbb{C}^{D \times 1}, \, n > N_F \end{cases} \qquad (7)$$

where $A^{H}$ is the conjugate transpose (Hermitian) of A.

At 508, a sum of squares of absolute values of both signal metrics ($|r_{t,n,p}|^2$) for each at least one DBF-panel 110 and each at least one SABFF-panel 120 may be taken.

At 510, arguments of the maxima (argmax) of $|r_{t,n,p}|^2$ may be taken, which may yield at least one index, $idx_{supp}$, indicating a position of a candidate for the (estimated) strongest direction in the plurality of candidates. $idx_{supp}$ may be denoted as:

$$idx_{supp} = \arg\max \sum_{t,n,p} |r_{t,n,p}|^2 \in \{1, \dots , D\}. \qquad (8)$$

Then, at 512, a beam (e.g., direction) corresponding to the strongest eigenvalue of the common covariance matrix would be $A(:,idx_{supp})$—i.e., strongest direction from the plurality of candidates. In other words, the at least one estimated strongest direction of the common covariance matrix comprises an eigenvector corresponding to a strongest eigenvalue of the common covariance matrix, which comprises $A(:,idx_{supp})$.

Two examples to design the beamforming for at least one SABFF_panel 120 are provided herein.

In one example, referring to the following embodiments: 1) where the common covariance matrix comprises a panel covariance matrix for all users an uplink pilot is associated with or alternatively 2) where apparatus 300 determines a common direction for more than one user an uplink pilot is associated with. I.e., both 1) and 2) may comprise, at least in one aspect, the same embodiment, expressed differently.

At first, a single user normalized panel covariance matrix, $\tilde{Q}_k$, can be expressed:

$$\tilde{Q}_k = A\left(:, idx_{supp}^{(k)}\right) A^{H}\left(:, idx_{supp}^{(k)}\right) \qquad (9)$$

wherein the superscript k of $$idx_{supp}^{(k)}$$

denotes one user from a plurality of users from which at least one uplink pilot is received from. Then, the quantity $Q_i = Q_{panel}$ (as presented above), by which analog beamforming may be solved, can be set to $Q_{panel} = \Sigma_k \tilde{Q}_k$, where $Q_{panel}$ comprises the strongest support of all users that contribute to the design of the analog beamforming (analog beamforming comprises the beamforming for at least one SABFF-panel 120).

In other words, the panel covariance matrix for all users ($Q_{panel}$) is based on an estimated strongest direction of a common covariance matrix of each user ($\tilde{Q}_k$) an uplink pilot is associated with. And, the single user normalized panel covariance matrix comprises a common covariance matrix of a user (from a plurality of users).

In a second example, referring to the embodiment, where apparatus 300 determines a user specific direction for at least one user, the at least one uplink pilot is associated with, it can be assumed that available panels/RF-chain are divided among (i.e., associated to) different users k. For example, each panel to one user. Then analog beamforming for each panel may be designed based on a covariance matrix of associated users. For example, in an extreme case that each panel i is associated to only one user, then analog beamforming for panel i can be designed by solving the problem presented in Eq. 4. If the candidates in the plurality of candidates, A, satisfy the constant modulus constraint in Eq. 2, the optimal solution of this problem is given by $$v_i = A\left( : , idx_{supp}^{(k)} \right).$$

Figure 5B:
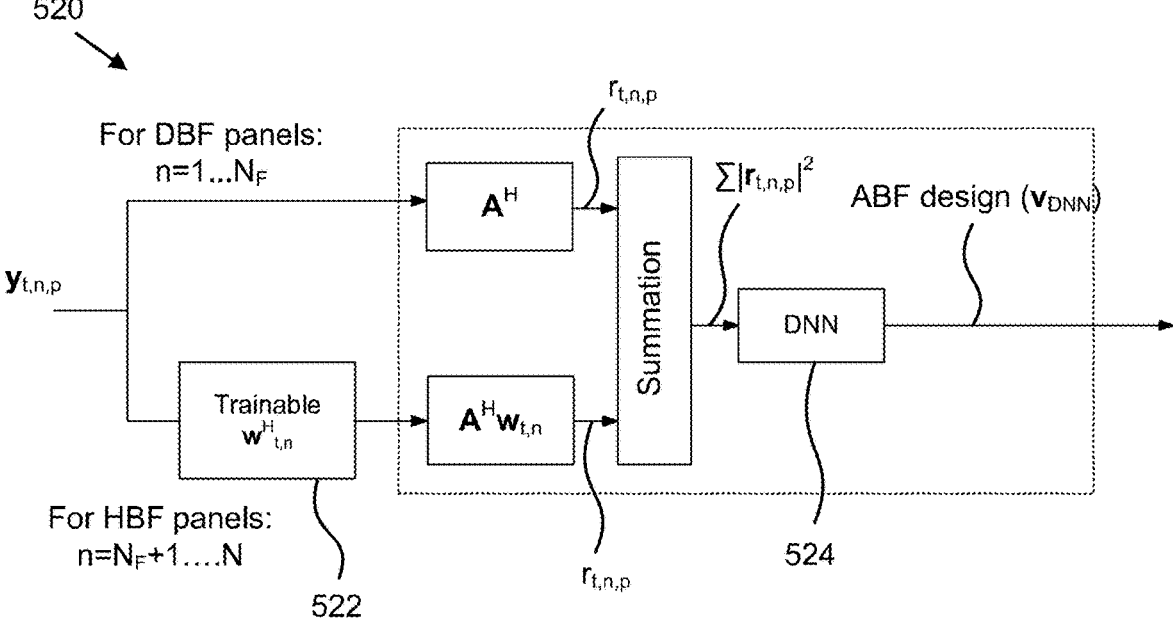
FIG. 5B illustrates a signal flow diagram according to an example embodiment.

FIG. 5B illustrates an example signal flow diagram 520, wherein at least one block (i.e., stage/phase/step) of FIG. 5A may be replaced by a deep neural network, DNN. FIG. 5B relates to the above described embodiments, where, at first, at least a portion of the estimation of the at least one strongest direction of the common covariance matrix is performed by utilizing a first deep neural network, DNN, and at second, where the combination phase of each subarray in the at least one SABFF-panel is performed by utilizing a second DNN.

In the example of FIG. 5B, the absolute values of both signal metrics ($|r_{t,n,p}|^2$) may be provided to first DNN 524, and first DNN 524 may be trained to provide analog beamforming design (e.g., $V_{DNN}$) as a response to the provided input. Wherein the analog beamforming design may comprise the analog beamforming matrix, $V_{RF}$, of Eq. 1, for example. A loss function for first DNN 524 may be set as $$\mathcal{L} = -\left| v_{DNN}^H v_{opt} \right|,$$

where $v_{opt}$ is an optimal analog beamformer designed based on a covariance matrix assumed to be available for a training set.

Alternatively, first DNN 524 may output a phase value, $\theta_{DNN}$, used for analog beamforming assuming a DFT-type structure, and the loss function can be set as $\mathcal{L}=-|\theta_{DNN}-\theta_{opt}|$, where $\theta_{opt}$ is an optimal design for an ideal covariance matrix assumed to be available for the training set.

Furthermore, analog combining at 502, may be replaced by second DNN 522, where the effect of analog combination can be estimated by second DNN 522 as a response to one or more uplink pilots as an input.

FIG. 6 illustrates method 600 according to an example embodiment. Method 600 may be performed by, for example an apparatus comprising at least one processor and at least one memory such as apparatus 300. A computer program may comprise instructions, which causes an apparatus to perform method 600.

At 602, method 600 may comprise receiving at least one uplink pilot associated with a receiver, wherein the at least one uplink pilot is transmitted over at least one time-frequency unit, and wherein the receiver comprises at least one digital beamforming, DBF, -panel and at least one subarray-based beamforming, SABBF, -panel, the at least one DBF-panel having an associated DBF-channel and the at least one SABBF-panel having an associated SABBF-channel.

At 604, method 600 may comprise: based on channel distributions of the DBF-channel and the SABFF-channel and further based on the at least one uplink pilot, determining at least one estimated strongest direction of a common covariance matrix associated with the at least one DBF-panel and the at least one SABBF-panel.

And at 606, method 600 may comprise determining a beamforming vector for at least one transmission or at least one reception phase based on the at least one estimated strongest direction of the common covariance matrix.

Figure 7:
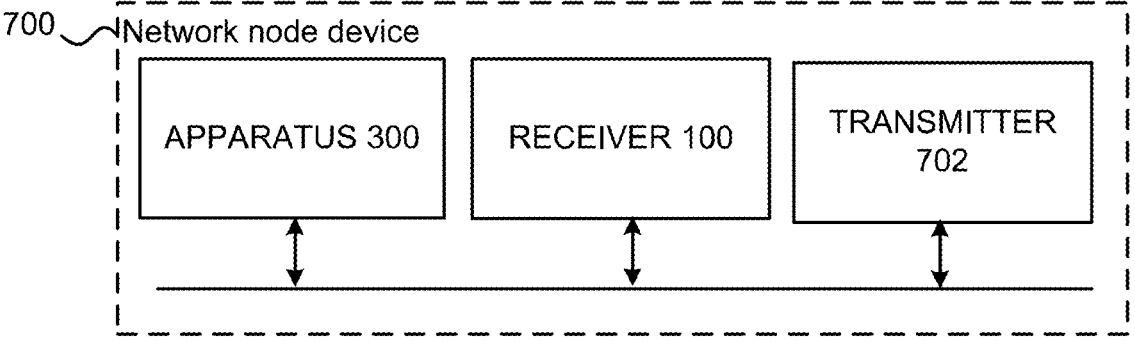
FIG. 7 illustrates a network node device according to an example embodiment.

FIG. 7 illustrates example of a network node device 700 according to an example embodiment. Network node device 700 may comprise an embodiment of apparatus 300, and embodiment of receiver 100 and transmitter 702. As an example, apparatus 300 may not necessarily comprise transceiver 306, and receiver 100 and transmitter 702 may comprise the networking/communication functionality of network node device 700. In this example embodiment, receiver 100 and transmitter 702 are configured to handle communications via at least one cellular communication protocol. Transmitter 702 may comprise, for example, PC-HBF 400 illustrated in FIG. 4.

Figure 8:
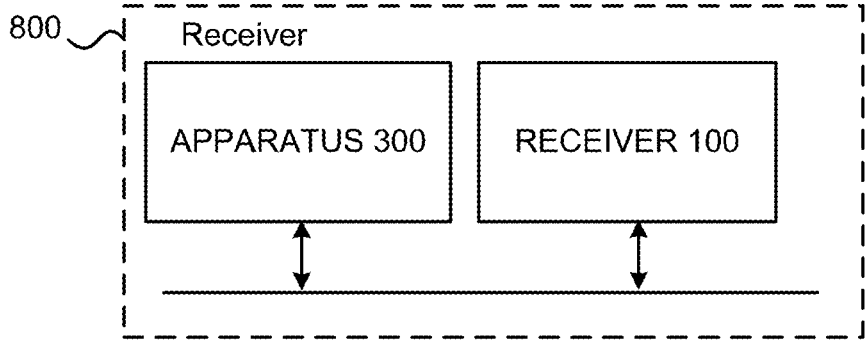
FIG. 8 illustrates a receiver according to an example embodiment.

FIG. 8 illustrates an example embodiment of receiver 800. Receiver 800 may comprise, for example, receiver 100 and apparatus 300. In other words, receiver 800 may comprise any/all aspects of receiver 100 illustrated in FIG. 1 and any aspect of apparatus 300.

Another example of an apparatus suitable for carrying out the embodiments and examples of apparatus 300 disclosed herein, and with regards to FIGS. 1-8 may comprise at least: means for receiving at least one uplink pilot associated with a receiver, wherein the at least one uplink pilot is transmitted over at least one time-frequency unit, and wherein the receiver comprises at least one digital beamforming, DBF, -panel and at least one subarray-based beamforming, SABBF, -panel, the at least one DBF-panel having an associated DBF-channel and the at least one SABBF-panel having an associated SABBF-channel; means for determining at least one estimated strongest direction of a common covariance matrix associated with the at least DBF-panel and the at least one SABFF-panel based on channel distributions of the DBF-channel and the SABFF-channel and further based on the at least one uplink pilot; and means for determining a beamforming vector for at least one transmission or at least one reception phase based on the at least one estimated strongest direction of the common covariance matrix.

The at least one estimated strongest direction of the common covariance matrix may comprise an eigenvector corresponding to a strongest eigenvalue of the common covariance matrix.

Furthermore, another example of an apparatus suitable for carrying out the embodiments and examples of apparatus 300 disclosed herein, and with regards to FIGS. 1-8 may comprise at least: means for determining a plurality of candidates for the strongest direction of the common covariance matrix; and means for determining the at least one estimated strongest direction of the common covariance matrix further based on the plurality of candidates.

The plurality of candidates for the strongest direction of the common covariance matrix may comprise an over-sampled Discrete Fourier Transform, DFT, matrix.

Furthermore, another example of an apparatus suitable for carrying out the embodiments and examples of apparatus 300 disclosed herein, and with regards to FIGS. 1-8 may comprise at least: means for determining a plurality of signal metrics, wherein each signal metric from the plurality of signal metrics is associated with one from the plurality of candidates based on the plurality of candidates and the at least one uplink pilot; and means for determining the at least one estimated strongest direction of the common covariance matrix further based on the determined plurality of signal metrics.

Furthermore, another example of an apparatus suitable for carrying out the embodiments and examples of apparatus 300 disclosed herein, and with regards to FIGS. 1-8 may comprise at least: means for determining the plurality of signal metrics based on an inner product between the plurality of candidates and the at least one uplink pilot.

Furthermore, another example of an apparatus suitable for carrying out the embodiments and examples of apparatus 300 disclosed herein, and with regards to FIGS. 1-7 may comprise at least: means for determining a common direction for more than one user the at least one uplink pilot is associated with; and means for determining the beamforming vector further based on the common direction.

Furthermore, another example of an apparatus suitable for carrying out the embodiments and examples of apparatus 300 disclosed herein, and with regards to FIGS. 1-8 may comprise at least: means for associating at least one panel from the at least one SABBF-panel and the at least one DBF-panel to each user an uplink pilot is associated with; means for determining an estimated strongest direction of a common covariance matrix of the at least one panel a user is associated with; and means for determining the beamforming vector for the associated at least one panel.

Furthermore, another example of an apparatus suitable for carrying out the embodiments and examples of apparatus 300 disclosed herein, and with regards to FIGS. 1-8 may comprise at least: means for determining a user specific direction for at least one user the at least one uplink pilot is associated with; and means for determining beamforming for at least one subsequent transmission phase at least in the at least one SABBF-panel for the at least one user from which the at least one uplink pilot is obtained.

Furthermore, another example of an apparatus suitable for carrying out the embodiments and examples of apparatus 300 disclosed herein, and with regards to FIGS. 1-8 may comprise at least: means for performing at least a portion of the determination of the at least one estimated strongest direction of the common covariance matrix by utilizing a first deep neural network, DNN.

Furthermore, another example of an apparatus suitable for carrying out the embodiments and examples of apparatus 300 disclosed herein, and with regards to FIGS. 1-8 may comprise at least: means for performing a combination phase of each subarray in the at least one SABFF-panel by utilizing a second DNN.

Furthermore, another example of an apparatus suitable for carrying out the embodiments and examples of apparatus 300 disclosed herein, and with regards to FIGS. 1-8 may comprise at least: means for determining at least a portion of the at least one estimated strongest direction of the common covariance matrix, based on a substantial sparsity of the at least one DBF-channel and the at least one SABBF-channel.

'The means' may comprise, for example, a combination of at least one processor 302, at least one memory 304 and at least one transceiver 306. Or alternatively, means may comprise a combination of apparatus 300, receiver 100 and transmitter 702, or receiver 800 for example.

Furthermore, an example of a receiver for carrying out the embodiments and examples disclosed herein, and with regards to FIGS. 1-8 may comprise an apparatus/receiver comprising apparatus 300, at least one DBF-panel 110 and at least one SABFF-panel 120.

Furthermore, an example of a network node device carrying out the embodiments and examples disclosed herein may comprise the receiver of above example and, for example, PC-HBF transmitter 400 illustrated in FIG. 4.

Furthermore, an example of a network node device for carrying out the embodiments and examples disclosed herein may comprise at least one of: receiver 100, apparatus 300 or PC-HBF transmitter 400.

Further example embodiments of method 600 are listed below.

Method 600 may further comprise: the at least one estimated strongest direction of the common covariance matrix comprises an eigenvector corresponding to a strongest eigenvalue of the common covariance matrix.

Method 600 may further comprise: determining a plurality of candidates for the strongest direction of the common covariance matrix; and determining the at least one estimated strongest direction of the common covariance matrix further based on the plurality of candidates.

Method 600 may further comprise: the plurality of candidates for the strongest direction of the common covariance matrix comprises an oversampled Discrete Fourier Transform, DFT, matrix.

Method 600 may further comprise: based on the plurality of candidates and the at least one uplink pilot, determining a plurality of signal metrics, wherein each signal metric from the plurality of signal metrics is associated with one from the plurality of candidates; and determining the at least one estimated strongest direction of the common covariance matrix further based on the determined plurality of signal metrics.

Method 600 may further comprise: the plurality of signal metrics is determined based at least partially on an inner product between the plurality of candidates and the at least one uplink pilot.

Method 600 may further comprise: determining a common direction for more than one user the at least one uplink pilot is associated with; and determining the beamforming vector further based on the common direction.

Method 600 may further comprise: determining a user specific direction for at least one user the at least one uplink pilot is associated with; and determining the beamforming vector further based on the user specific direction.

Method 600 may further comprise: the common covariance matrix comprises a panel covariance matrix for all users an uplink pilot is associated with.

Method 600 may further comprise: the panel covariance matrix for all users is based on an estimated strongest direction of a common covariance matrix of each user an uplink pilot is associated with.

Method 600 may further comprise: associating at least one panel from the at least one SABBF-panel and the at least one DBF-panel to each user an uplink pilot is associated with; determining an estimated strongest direction of a common covariance matrix of the at least one panel a user is associated with; and determining the beamforming vector for the at least one associated panel.

Method 600 may further comprise: performing at least a portion of the determination of the at least one estimated strongest direction of the common covariance matrix by utilizing a first deep neural network, DNN.

Method 600 may further comprise: perform a combination phase of each subarray in the at least one SABFF-panel by utilizing a second DNN.

Method 600 may further comprise: at least a portion of the at least one estimated strongest direction of the common covariance matrix is based on a substantial sparsity of the at least one DBF-channel and the at least one SABBF-channel.

One or more of the example and example embodiments discussed above may enable a solution which enables an apparatus to determine a beamforming vector for a receiver comprising one or more subarray-based beamforming panels based on an estimation of at least one strongest direction of a common covariance matrix. Hybrid beamformers may enable a better power efficiency compared to fully-digital beamformers.

At least a portion of the functionality described herein can be performed, at least in part, by one or more computer program product components such as software components. According to an embodiment, apparatus 300 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Tensor Processing Units (TPUs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus, comprising:
at least one processor; and
at least one memory storing instructions which, when executed by the at least one processor, cause the apparatus at least to:
receive at least one uplink pilot associated with a receiver, wherein the at least one uplink pilot is transmitted over at least one time-frequency unit, and wherein the receiver comprises at least one digital beamforming, DBF, -panel and at least one subarray-based beamforming, SABBF, -panel, the at least one DBF-panel having an associated DBF-channel and the at least one SABBF-panel having an associated SABBF-channel;
based on channel distributions of the DBF-channel and the SABFF-channel and further based on the at least one uplink pilot, determine at least one estimated strongest direction of a common covariance matrix associated with the at least one DBF-panel and the at least one SABBF-panel; and
determine a beamforming vector for at least one transmission phase or at least one reception phase based on the at least one estimated strongest direction of the common covariance matrix.

2. The apparatus according to claim 1, wherein the at least one estimated strongest direction of the common covariance matrix comprises an eigenvector corresponding to a strongest eigenvalue of the common covariance matrix.

3. The apparatus according to claim 1, wherein the instructions, when executed by the at least one processor, further cause the apparatus at least to:
determine a plurality of candidates for a strongest direction of the common covariance matrix; and
determine the at least one estimated strongest di-rection of the common covariance matrix further based on the plurality of candidates.

4. The apparatus according to claim 3, wherein the plurality of candidates for the strongest di-rection of the common covariance matrix comprises an over-sampled Discrete Fourier Transform, DFT, matrix.

5. The apparatus according to claim 3, wherein the instructions, when executed by the at least one processor, further cause the apparatus at least to:
based on the plurality of candidates and the at least one uplink pilot, determine a plurality of signal metrics, wherein each signal metric from the plurality of signal metrics is associated with one from the plurality of candidates; and
determine the at least one estimated strongest di-rection of the common covariance matrix further based on the determined plurality of signal metrics.

6. The apparatus according to claim 5, wherein the plurality of signal metrics is determined based at least partially on an inner product between the plurality of candidates and the at least one uplink pilot.

7. The apparatus according to claim 1, wherein the instructions, when executed by the at least one processor, further cause the apparatus at least to:

determine a common direction for more than one user a received uplink pilot is associated with; and determine the beamforming vector further based on the determined common direction.

8. The apparatus according to claim 1, wherein the instructions, when executed by the at least one processor, further cause the apparatus at least to:

determine at least one user specific direction for at least one user the at least one uplink pilot is associated with; and determine the beamforming vector further based on the at least one user specific direction.

9. The apparatus according to claim 1, wherein the instructions, when executed by the at least one processor, further cause the apparatus at least to:

perform at least a portion of the determination of the at least one estimated strongest direction of the common covariance matrix by utilizing a first deep neural network, DNN.

10. The apparatus according to claim 1, wherein the instructions, when executed by the at least one processor, further cause the apparatus at least to:

perform a combination phase of each subarray in the at least one SABFF-panel by utilizing a second DNN.

11. The apparatus according to claim 1, wherein at least a portion of the at least one estimated strongest direction of the common covariance matrix is based on a substantial sparsity of the at least one DBF-channel and the at least one SABBF-channel.

12. A receiver comprising:

the apparatus according to claim 1;

the at least one DBF-panel; and the at least one SABBF-panel.

13. A network node device comprising the receiver of claim 12.

14. A method, comprising:

receiving at least one uplink pilot associated with a receiver, wherein the at least one up-link pilot is transmitted over at least one time-frequency unit, and wherein the receiver comprises at least one digital beamforming, DBF, -panel and at least one subarray-based beamforming, SABBF, -panel, the at least one DBF-panel having an associated DBF-channel and the at least one SABBF-panel having an associated SABBF-channel;

based on channel distributions of the DBF-channel and the SABFF-channel and further based on the at least one uplink pilot, determining at least one estimated strongest direction of a common covariance matrix associated with the at least one DBF-panel and the at least one SABBF-panel; and determining a beamforming vector for at least one transmission phase or at least one reception phase based on the at least one estimated strongest direction of the common covariance matrix.

15. A non-transitory computer-readable medium comprising program instructions which when executed by an apparatus cause the apparatus to perform the method of claim 14.

\*    \*    \*    \*    \*